United States Patent

Miettinen et al.

[15] 3,663,261

[45] May 16, 1972

[54] METHOD FOR PREPARING PLASTIC IMPREGNATED WOOD BY RADIATION POLYMERIZATION

[72] Inventors: Jorma Miettinen; Timo Autio; Juhani Stromberg, all of Helsinki, Finland

[73] Assignee: Prof. Jorma Kalervo Miettinen, Helsinki, Finland

[22] Filed: Feb. 19, 1968

[21] Appl. No.: 706,645

[30] Foreign Application Priority Data

Feb. 23, 1967 Finland..................................548/67

[52] U.S. Cl..............................117/59, 117/61, 117/93.31, 117/116, 117/119, 117/148, 117/161 K, 204/159.12, 260/33.6 UA
[51] Int. Cl.......................B27k 3/50, B44d 1/28, B44d 1/50
[58] Field of Search....................117/93.31, 59, 61, 62, 148, 117/161 K; 204/159.15, 159.12; 260/33.6 U, 45.7

[56] References Cited

UNITED STATES PATENTS

| | | | |
|---|---|---|---|
| 2,020,172 | 11/1935 | Cotchett | 117/59 |
| 2,867,543 | 1/1959 | Braun, Jr. | 117/59 X |
| 2,926,126 | 2/1960 | Graham et al. | 117/93.31 UX |
| 2,947,648 | 8/1960 | Sonnabend et al. | 117/59 |
| 3,029,159 | 4/1962 | Bliven et al. | 117/59 |
| 3,089,832 | 5/1963 | Black et al. | 204/159.15 X |
| 3,326,710 | 6/1967 | Brodie | 117/62 |
| 3,437,512 | 4/1969 | Burlant et al. | 204/159.15 X |

*Primary Examiner*—Alfred L. Leavitt
*Assistant Examiner*—Thomas E. Bokan
*Attorney*—Albert M. Parker

[57] ABSTRACT

The present invention relates to a method for preparing plastic impregnated wood, in which dry wood (moisture content below 10 percent) is impregnated with liquid resin material in a manner prior known per se e.g. the wood is put into a vacuum impregnation vessel, the air is evacuated, the vessel flushed with nitrogen, the liquid resin is introduced in the vessel until the wood is immersed, an atmospheric nitrogen pressure or an overpressure of 1 to 8 atmospheres gauge is applied. The wood is transferred into bags or containers filled with nitrogen, then hermetically sealed, then the impregnated wood is cured utilizing radioactive radiation optionally in the presence of chemical catalyst addition. The resin utilized for the wood impregnation contains commercial unsaturated polyester between 35 and 95 percent and styrene and/or methyl methacrylate. The amount of radiation is between 0.5 and 1.5 Mrad in the case of gamma radiation and between 1 and 5 Mrad if high energy electron radiation is used. As chemical catalyst is used an organic peroxide and the curing is carried out at a temperature between 40° and 60° C. utilizing as additives when necessary chemical inhibitors such as pinene in an amount of less than 5 percent.

1 Claims, No Drawings

METHOD FOR PREPARING PLASTIC IMPREGNATED WOOD BY RADIATION POLYMERIZATION

BACKGROUND OF THE INVENTION

1. Field of the Invention

This invention relates to a method for preparing plastic impregnated wood by the utilization of radiation polymerization, and the object of the invention is to provide a method which both technically and economically is more advantageous than heretofore known methods for preparing plastic impregnated wood.

2. Description of the Prior Art

Efforts for improving the properties of wood, particularly for increasing its strength and for decreasing its dimensional instability due to moisture content variations, have been made with varying success for decades. In the nineteen thirties the impregnation of wood with phenol formaldehyde resins and their polymerization therein was studied, the results, however, not being very promising.

In 1958 D. L. Kenega from the Dow Chemical Co. applied for four U.S. Pat. (Nos. 3,077,417, -418, -419, -420, granted Feb. 12th 1963), which related to increasing the dimensional stability of wood by producing cross links in the same by means of a polymeric resin. The first of said patents related primarily to acrylic compounds and the fourth of them to certain epoxy derivatives. Wood was impregnated with a 25 percent methanol solution of the resin monomer and radiated by a dose of 10 Mrad, whereby the wood took up about 25 percent of resin based on the dry weight of the wood. This decreased the swelling of the wood by about 40 percent (3 days' immersion in water).

After this the impregnation of wood with vinyl monomers has been eagerly studied in various countries and about 30 publications on the subject have been published. This research work, which is more fully described in an article by Prof. J K Miettinen in Kemian Teollisuus 23 (1966) 1084–1088 and in an article by prof. J K Miettinen and Mr. Timo Autio in Teknisk Forum 19/1966, can be divided into two groups.

1. In the work where the object was to produce cross link formation in the wood cellulose it was found that the monomer (styrene) is partially engrafted into the cellulose only when a hydroxyl containing solvent such as methanol is used in mixture with the monomer. Hodgins (Kemian Teollisuus 23 (1966) 1084–1088, note 5) found that in this case the swelling of the wood will decrease the strength of the wood more than the cross link formation increases the same, and it appears that the use of swelling agents has generally been given up.

2. Primarily the work of the American J. A. Kent, in which relatively dry (moisture content less than 10 percent) wood was impregnated with dry monomer, particularly methyl methacrylate (MMA), which is polymerized already with a dose of 1.2 Mrad. The resultant polymer (PMMA) is scarcely at all engrafted into the wood but fills its pores, increasing particularly the hardness and the dimensional stability of the wood, also improving its other physical characteristics. This work was carried out with the support of a research grant from the U.S. Atomic Energy Commission and published as open reports. MMA is the most expensive of the more common vinyl monomers, but its advantages are its low heat of polymerization (130 Kcal/kg), its ready polymerizability by radiation, and the clearness, strength and weather resistance of the resulting polymer.

In his above-mentioned research Kent used not only MMA but also other vinyl and acryl monomers. Vinyl acetate is readily polymerized (1–1.2 Mrad) but the product is not particularly strong. A mixture of styrene and acrylonitrile is polymerized already by about 2 Mrad and the product is strong and weather resistant, but the high reaction heat (228 Kcal/kg) is a disadvantage.

The use of the two cheapest vinyl monomers, viz. vinyl chloride (VCl) and styrene (S) involves certain considerable difficulties. VCl is cheap, but its polymerization heat is high (270 Kcal/kg) and it is gaseous at room temperature (boiling point −14°C.), so that it is difficult to handle, requiring expensive pressure resistant impregnating equipment. The use of styrene is restricted by the high radiation dose (above 10 Mrad) it requires, by its high heat of polymerization (170 Kcal/kg) and by the poor resistance to daylight of the resulting resin.

In the USA the preparation of plastic impregnated wood from MMA has reached pilot plant stage in spite of the fact that the product is expensive and that PMMA is soluble in many organic solvents ($CCl_4$, $CHCl_3$, trichlorethylene) and therefore not suitable for tool parts etc.

During the last two years methods have been developed in the USA, involving the curing of varnishes and paints based on styrene and unsaturated polyesters by means of high energy electron radiation. Since the materials do not contain solvents, the curing can be effected in only a few seconds, which is a great advantage, for instance, in the moving line operations of motor car factories, because the great varnish drying damages are totally eliminated. There is no information on the use of these materials for the plastics impregnation of wood.

SUMMARY OF THE INVENTION

It has now been found that mixtures of commercial unsaturated polyesters with styrene and/or methyl methacrylate offer many advantages in comparison with other monomer mixtures. The available commercial polyester (containing 35 percent of styrene) has a heat of polymerization only in the range of 80 to 100 kcal/kg, and the radiation dose it requires is only 0.2 –0.3 Mrad. As such it is too viscous for wood impregnation, but by addition of 25–50 per cent styrene or a mixture of styrene and MMA a mixture is obtained which has a viscosity just suitable for impregnation but high enough not to flow off or in the wood before polymerization.

What is most important is, however, that the polyester radically decreases the radiation dose required by the styrene. While pure styrene requires 10–15 Mrad, a mixture of commercial polyester with 25–50 percent of styrene requires only 0.5–1.5 Mrad. Such a mixture gives a very strong product which compares favorably with MMA impregnated wood as to strength and dimensional stability, but is practically insoluble in organic solvents, which must be considered a very great advantage in comparison with MMA impregnated wood.

DESCRIPTION OF THE PREFERRED EMBODIMENT

The preparation of plastic impregnated wood is more fully described in the following by way of an example based on experiments carried out.

The preparation of plastic impregnated wood comprises the steps of pretreatment, impregnation and radiation. Since the product will in any case be comparatively expensive (five to ten times as expensive as wood per unit volume even in commercial scale operation), it is in general advisable to pre-form the wood already before impregnation into blanks approximating the final configuration of the product. Oven dry wood (moisture content 8–10 percent) is piled into a vacuum impregnation vessel, the air is evacuated, the vessel is flushed once or twice with nitrogen (air oxygen restricts polymerization), the liquid monomer is introduced until the blanks are immersed, after a vacuum period of about 1 hour an atmospheric nitrogen pressure or an overpressure of 1 to 8 atmospheres gauge is applied for 1 to 4 hours. At atmospheric pressure the wood pores are filled to about one half of their volume, birch wood absorbing about 50 percent, pine wood about 75 percent based on the dry weight of the wood. With overpressure birch wood will absorb about 70 to 100 percent and pine wood up to 150 percent based on the dry weight. When impregnation is sufficient, the excess monomer is let off into a storage container and the wood pieces are quickly transferred into plastics bags or into a metal container, which are flushed with nitrogen, hermetically sealed and exposed to radiation. In our own experiments the radiation was carried out in polythene bags sealed by welding or in metal containers at room temperature with about 40 to 50 Kilorads per hour dose rate by means of a Co–60 gamma cell.

This cell has as radiation source a plate measuring about 15 by 30 cm and consisting of 24 radioactive cobalt rods attached to a steel frame, the plate originally containing 10,000 curies of cobalt 60. Methyl methacrylate requires a radiation dose of about 1.2 Mrad, the application of which requires with the above-mentioned dose rate about 20 to 25 hours. Hereby about 96 to 98 percent of the monomer is polymerized into solid resin. When absorbed by the monomer the gamma radiation causes formation of the free radicals, which initiate the polymerization. The polymerization rate is at its maximum after about 4 to 5 hours at which time the temperature maximum is reached, for methyl methacrylate ranging from about 80°–9090°C. At this moment only about 80 percent is polymerized. Methyl methacrylate forms in the wood pores a clear, hard, weather resistant resin — the corresponding pure polymer is commercially known as Perspex,(ICI trade-mark). The gamma radiation (energy in the range of 1.17 and 1.33 MeV) emitted by the cobalt 60 is highly penetrating, resulting in a thoroughly uniform radiation dose even in thick pieces, if the piece is turned for 180° at half radiation time or otherwise suitably moved such as by rotating the piece.

The characteristics of plastic impregnated wood.

The characteristics of the product depend principally on three factors viz. the wood species, the type of the resin and the degree of impregnation. Almost all wood species can be utilized, the broad leaved species, however, being generally easier to impregnate. In American research work more than 20 wood species were utilized and it was found that the hardest wood species such as teak, palisander and hazelwood take up so little of the monomer (about 15 to 20 percent based on the dry weight), that the quality of the product scarcely improves. The best results were generally obtained with medium hard of hard broad leaved species such as birch, ash, oak, maple and elm.

The second factor of decisive importance with respect to the product quality is the type of resin. The most commonly used resins are listed in Table I, with the respective heats of polymerization also being indicated.

TABLE I

The most important monomers used in preparation of plastic impregnated wood and their respective heats of polymerization are as follows:

| Monomer | Kcals/kg |
|---|---|
| Methyl methacrylate (MMA) | 130 |
| Vinyl acetate (VA) | 250 |
| Styrene (S) | 170 |
| Styrene-acrylonitrile mixture (60% – 40% (60S/40A) | 228 |
| Acrylonitrile (A) | 165 |
| Vinyl chloride (VCl)+ | 270 |
| Unsaturated polyester (PE) (cont. 35% styrene) | 80–100 |

+ gaseous at room temperature (boiling point –14° C.).

The best understood so far is MMA, among the advantages of which are its ready polymerizability by means of gamma radiation, its low heat generation, excellent strength and weather resistance and the good appearance of the product, among its disadvantages its solubility in commercial solvents (i.a. $CCl_4$, $CHCl_3$) and its high price. It is also thermally readily softenably. The acrylic resins are generally strong, dimensionally stable, clear and weather resistant. The vinyl resins again have the advantages of flexibility, chemical resistance and low moisture absorption. The advantages of the styrene resins are toughness, good heat resistance and good electrical characteristics. Disadvantages of the vinyl resins are their high heat of polymerize by means of gamma radiation. The styrene-acrylonitrile mixture 60S/40A gives a strong and hard product with a high softening point and low moisture absorption. In our experiments good results were obtained with mixtures of polyesters and styrene. The greatest disadvantage of the polyesters is their high viscosity, generally ranging from 5 to 20 poise, their advantages are their ready polymerizability by means of gamma radiation and a very strong and insoluble product. In addition they are cheap. We have found that the polyesters can be mixed with about 40 to 50 percent of methyl methacrylate or styrene whereby their viscosity is decreased sufficiently to permit wood impregnation with the mixture. The styrene mixtures also are polymerized relatively readily, mixtures containing from 25 to 50 percent of styrene polymerizing with 0.5 to 1.5 Mrad up to 98 to 100 percent. Good strength increases in the plastics wood were obtained in the experiments. In the USA promising results were obtained with vinyl chloride but it is difficult to handle since it is gaseous at room temperature (b.p. –14°C.). It has the advantage of a low price. It has also the disadvantage of a high heat of polymerization and the fact that the polymer precipitates from the liquid monomer. Mixtures with MMA are possible.

The third factor of decisive importance on the product quality is its resin content. It appears that at least 30 to 40 percent resin must be present, based on the weight of the wood; the optimum appears to lie at about 100 percent based on the dry weight of the wood (50 percent based on the weight of the final product). The products Novawood and Lockwood available in the USA contain about 70 percent methyl methacrylate based on the weight of the wood. Birch, for instance, will take up this amount when impregnated for a long time at atmospheric pressure (after a good evacuation). Resin contents of more than 100 percent do not appreciably increase strength, while increasing the weight and the monomer consumption.

The utilization of radiation in the preparation of plastic impregnated wood is easy. Radiation is an absolutely reliable catalyst, uniformly penetrating through the thickest spars and permits a more uniform quality than generally can be achieved with chemical catalysts. It is not even necessary to remove the inhibitors from the monomer nor is it necessary to add any catalyst, whereby the excess from the impregnation step is recovered in pure state. Since the price of the monomer e.g. when methyl methacrylate is used amounts to over one half of the production cost, this circumstance naturally is of a great economic importance. The radiation catalyzes the reaction at room temperature already — even at lower temperatures when necessary — and the reaction rate can be adjusted at will by means of the radiation intensity, the temperature, and special accelerants and inhibitors for radiation catalysis. No residual catalysts remain in the product as impurities, and the price of the relatively expensive catalysts is saved. Wood consumes chemical catalysts, so that the catalysts consumption is relatively high. Further, when catalysts are used, the reaction has a tendency to get out of control. The monomer cannot be mixed with most dyestuffs if peroxide is used, since they can be oxidized thereby. Although the control of the reaction is easier when radiation is used as catalyst it is, however, also possible to use chemical catalysts (such as cyclohexanone peroxide + cobalt naphthenate), if care is taken at the same time with the help of a suitable inhibitor (such as pinene or dipentene), that the maximum temperature will not pass the value of about 130°C., at which the wood starts to darken and the product quality to deteriorate. An ideal method would be one in which a small amount of peroxide is used with terepene, abietic acid or some other similar inexpensive, engraftable byproduct of the wood processing industries as retardant for preventing a too violent reaction, and in which the reaction is only initiated at room temperature by means of radiation, but the product is left to "mature" in storage, with final heating when necessary. Hereby it is possible to manage with a quite small radiation source, especially if an accelerant for the radiation effect is used, and still to obtain the advantage offered by the possibility of adjusting the reaction rate. For instance, 10 percent of $CCl_4$ (carbon tetrachloride) in styrene decreases the necessary radiation dose by one half.

We claim:

1. A method for preparing plastic impregnated wood comprising subjecting dry wood to vacuum and then completely immersing the wood in a liquid resin material containing unsaturated polyester in the rang of from 35 to 95 percent and styrene, impregnating the wood at a pressure of at least 1 atmosphere gauge and adding to the resin during the impregnation an organic peroxide in the range of from 0.2 to 2 percent and alpha pinene in an amount less than 5 percent, and finally curing the impregnated wood at a temperature between 40° C and 60° C. utilizing high energy radiation.

* * * * *

UNITED STATES PATENT OFFICE
CERTIFICATE OF CORRECTION

Patent No. 3,663,261          Dated May 16, 1972

Inventor(s) Jorma Miettinen, et al

It is certified that error appears in the above-identified patent and that said Letters Patent are hereby corrected as shown below:

Column 3, line 16   should read   --80°-90°C. At this moment only about 80 percent is--;

Column 3, line 74   should read   --heat of polymerization; styrene in its pure state is further difficult to polymerize by means of gamma radiation. The styrene--;

Column 4, line 64   "terepene" should read --terpene--;

Column 5, line 5    "rang" should read --range--.

Signed and sealed this 7th day of November 1972.

(SEAL)
Attest:

EDWARD M. FLETCHER, JR.                ROBERT GOTTSCHALK
Attesting Officer                      Commissioner of Patents